US010139640B2

(12) United States Patent
Shinohara et al.

(10) Patent No.: US 10,139,640 B2
(45) Date of Patent: Nov. 27, 2018

(54) OPTICAL DEVICE

(71) Applicant: OMRON Corporation, Kyoto (JP)

(72) Inventors: Masayuki Shinohara, Kyoto (JP);
Norikazu Kitamura, Kyoto (JP);
Yasuhiro Tanoue, Kyoto (JP); Mitsuru Okuda, Kyoto (JP); Kazuyuki Okada, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/709,181

(22) Filed: Sep. 19, 2017

(65) Prior Publication Data

US 2018/0003998 A1 Jan. 4, 2018

Related U.S. Application Data

(63) Continuation of application No. PCT/JP2016/057200, filed on Mar. 8, 2016.

(30) Foreign Application Priority Data

May 21, 2015 (JP) .................. 2015-103479

(51) Int. Cl.
*F21V 7/04* (2006.01)
*G02B 27/22* (2018.01)
(Continued)

(52) U.S. Cl.
CPC .......... *G02B 27/2242* (2013.01); *G02B 3/08* (2013.01); *G02B 5/00* (2013.01); *G02B 5/18* (2013.01);
(Continued)

(58) Field of Classification Search
CPC ... G02B 3/08; G02B 5/00; G02B 5/18; G02B 6/0023; G02B 6/0036; G02B 6/0058;
(Continued)

(56) References Cited

U.S. PATENT DOCUMENTS

2014/0268327 A1 9/2014 Dunn et al.

FOREIGN PATENT DOCUMENTS

JP 2000510603 A 8/2000
JP 2008275922 A 11/2008
(Continued)

OTHER PUBLICATIONS

International Search Report Issued in corresponding International Patent Application No. PCT/JP2016/057200, dated Apr. 12, 2016 (2 pages).

*Primary Examiner* — Jason M Han
(74) *Attorney, Agent, or Firm* — Osha Liang LLP

(57) ABSTRACT

An optical device includes a light guide plate configured to guide light within a plane parallel to an emission surface, and a plurality of light focusing portions to which the light guide plate guides directional light. Each of the plurality of light focusing portions is provided with an optical surface configured to create from the directional light incident thereon emission light in a direction substantially converging on a single convergence point or convergence line in a space or to create emission light that substantially diverges from a single convergence point of convergence line in a space and exits from the emission surface. The plurality of light focusing portions are provided near the emission surface of the light guide plate, and each of the plurality of light focusing portions is formed along a predetermined line within a plane parallel to the emission surface.

20 Claims, 7 Drawing Sheets

(51) Int. Cl.
*G02B 3/08* (2006.01)
*G02B 5/00* (2006.01)
*G02B 5/18* (2006.01)
*G03B 35/24* (2006.01)
*F21V 8/00* (2006.01)

(52) U.S. Cl.
CPC ........... *G02B 6/006* (2013.01); *G02B 6/0023* (2013.01); *G02B 6/0036* (2013.01); *G02B 6/0058* (2013.01); *G02B 27/22* (2013.01); *G03B 35/24* (2013.01)

(58) Field of Classification Search
CPC .... G02B 6/006; G02B 27/22; G02B 27/2242; G03B 35/24
USPC ......................... 362/602–603, 612, 617–620
See application file for complete search history.

(56) References Cited

FOREIGN PATENT DOCUMENTS

| | | |
|---|---|---|
| JP | 2009540440 A | 11/2009 |
| JP | 2012008484 A | 1/2012 |

| ψ | 5 degrees | 10 degrees | 15 degress | 20 degress |
|---|---|---|---|---|
| Subject A | × | × | × | ○ |
| Subject B | × | × | × | ○ |
| Subject C | × | × | ○ | ○ |
| Subject D | × | × | × | ○ |
| Subject E | × | × | × | ○ |

OPTICAL DEVICE

BACKGROUND

Technical Field

The present invention relates to an optical device.

Related Art

Stereoscopic displays are known. The stereoscopic display is equipped with a light guide plate and a light source, and depending on whether the display uses a parallax barrier or a lens array, a mask or a lens array provided at the front surface of the light guide plate (e.g., Patent Document 1).
Patent Document 1:
Japanese Unexamined Patent Application Publication No. 2012-008464

SUMMARY

Providing a mask or lens array may complicate the optical device structure, the deformation of the three-dimensional image may also he noticeable, and using the light from a transparent optical device to produce a three-dimensional image also tends to be challenging.

An optical device according to one or more embodiments of the invention includes a light guide plate configured to guide light within a plane parallel to an emission surface; and a plurality of light focusing portions whereto the light guide plate guides directional light, each light focusing portion provided with an optical surface configured to create from the directional light incident thereon emission light in a direction substantially converging on a single convergence point or convergence line in a space or to create emission light that basically diverges from a single convergence point of convergence line in a space and exits from the emission surface; wherein the plurality of light focusing portions provided near the emission surface of the light guide plate and each formed along a predetermined line within a plane parallel to the emission surface; and the convergence point or convergence line are mutually different between the plurality of light focusing portions with a grouping of the plurality of convergence points or convergence lines forms an image in a space.

The divergence angle of light guided by the light guide plate may be less than or equal to 5° in a plane parallel to the emission surface.

The expression $1.5\theta < \Phi\Delta p/5$ may be satisfied when taking $\theta$ as the divergence angle of light guided in the light guide plate, and $\Phi\Delta p$ as the angle between a line connecting two endpoints in the image in a direction along a predetermined line and a line connecting each of the plurality of light focusing portions.

The expression $1.5\theta < \Phi\Delta i$ may be satisfied when taking $\theta$ as the divergence angle of light guided in the light guide plate and $\Phi\Delta i$ as the angle formed between a line connecting two features in the image and lines connecting each of the plurality of light focusing portions.

The expression $1.5\theta < 2\Phi\Delta r$ may be satisfied when taking $\theta$ as the divergence angle of light guided in the light guide plate and $\Phi\Delta r$ as the angle between two of the convergence points adjacent in a direction orthogonal to a predetermined line and a line connecting each of the plurality of light focusing portions.

The expression $W \leq L/10$ is satisfied when taking L as the distance between an incidence end surface of the light guide plate and the center of the emission surface and W as the width light entering from the incidence end surface spreads.

The optical device may further include a light source; and a light shielding part may be located between the incidence end surface and the light source, the light shielding part provided with a window configured to limit the light entering the incidence end surface.

At least one of the light focusing portions may include a plurality of refraction surfaces arranged continuously along a predetermined line.

The plurality of light focusing portions may be configured so that the length of a light focusing portion along the direction orthogonal to the predetermined line does not exceed one half the distance to an adjacent light focusing portion in a direction orthogonal to the predetermined line.

At least one of the light focusing portions may include a plurality of optical surfaces forming a diffraction grating.

At least one of the light focusing portions may include a plurality of optical surfaces forming a Fresnel lens.

At least one of the light focusing portions may include a plurality of refraction surfaces arranged continuously along a predetermined line.

The expression $\Delta\phi < 1.5\theta$ may be satisfied when taking $\Delta\phi$ as the angle formed between a line connecting a first optical surface from the plurality of optical surfaces partitioned and the convergence point or a point along the convergence line and a line connecting a second optical surface adjacent to the first optical surface and the convergence point or a point along the convergence line, and taking $\theta$ as the divergence angle of light guided by the light guide plate.

The angle formed between a line connecting a first optical surface from the plurality of optical surfaces partitioned and the convergence point or a point along the convergence line and a line connecting a second optical surface adjacent to the first optical surface and the convergence point or a point along the convergence line may be less than 5°.

The expression $\Delta\phi < 1.5\theta$ may satisfied when taking A as the angle formed between a line connecting a first optical surface from the plurality of optical surfaces partitioned and the convergence point or a point along the convergence line and a line connecting a second optical surface adjacent to the first optical surface and the convergence point or a point along the convergence line, and taking $\theta$ as the divergence angle of light guided by the light guide plate.

The pattern density of the plurality of optical surfaces provided to the plurality of light focusing portions may be less than or equal to 30% in a plane parallel to the emission surface.

Note that the above summary does not list all the features of the present invention. For example, sub-combinations of these sets of features are also within the scope of the invention.

DETAILED DESCRIPTION

Embodiments of the present invention are described below. However, the below embodiments do not limit a scope of the present invention. All combinations of the features described in the embodiments are not necessarily required. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
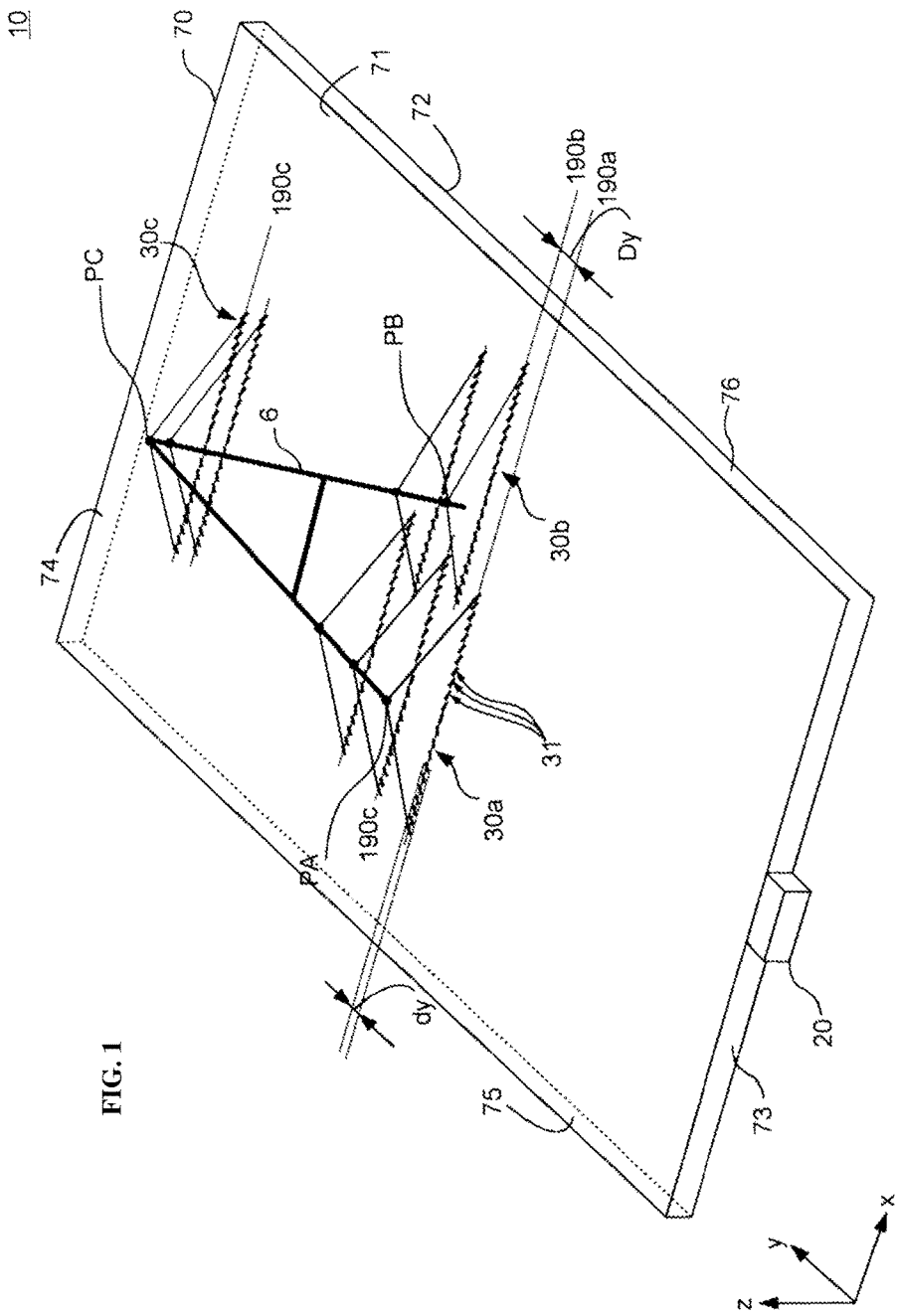
FIG. 1 is a schematic view of a display device 10 according to one or more embodiments of the present invention, along with a three-dimensional image projected onto a space.
Figure 2:
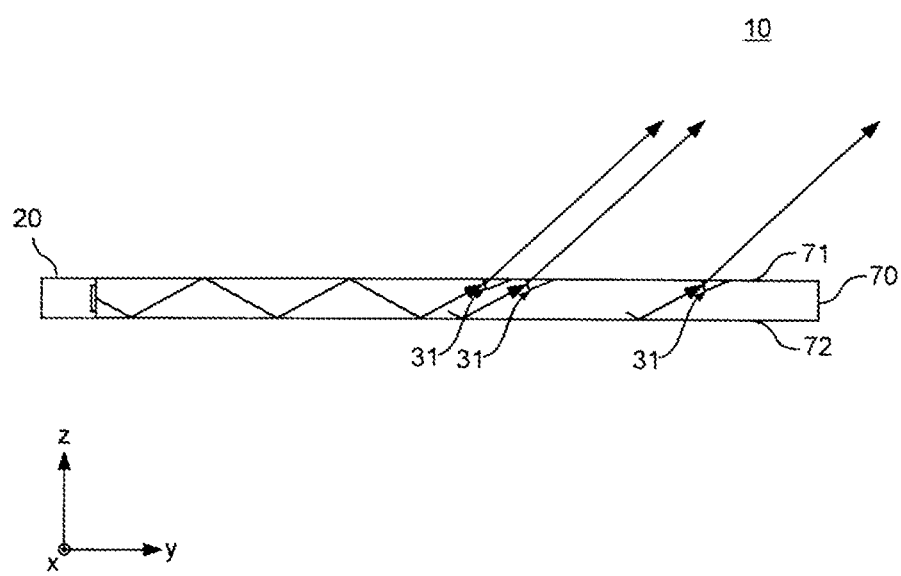
FIG. 2 outlines a cross section yz of the display device 10.

FIG. 1 is a schematic view of a display device 10 according to one or more embodiments of the present invention, along with a three-dimensional image projected onto a space. FIG. 2 outlines a cross section yz of the display device 10. The drawings are provided as outlines or schematic views to provide a plain and easily understandable description. The embodiments described using the drawings are at times not to scale.

The display device 10 includes an emission surface 71 that emits light. The display device 10 uses light emitted from the emission surface 71 to produce a three-dimensional image 6. The image 6 forms the image of the letter "A" in a space. The image 6 is a three-dimensional image perceived by the user in the space. Note that, the term three-dimensional image refers to an image that appears to be at a location that is different from the emission surface 71 of the display device 10. The term three-dimensional image also includes a two-dimensional image perceived at a location away from the emission surface 71 of the display device 10, for instance. In other words the term "three-dimensional image" does not refer only to an image perceived as having a solid shape, but also includes an image in two-dimensional form perceived at a different location than on the display surface of the display device 10.

The display device 10 is provided with a light guide plate 70 and a light source 20. The light guide plate 70 is a transparent resin material with a relatively high index of refraction. The light guide plate 70 may be produced from, for instance, a polycarbonate resin (PC), a poly methyl methacrylate resin (PMMA), glass or the like. The light guide. plate 70 is one example of the optical device.

The light guide plate 70 includes an emission surface 71, and a rear surface 72 on the opposite side of the emission surface 71. The emission surface 71 is one principal surface of the light guide plate 70 and the rear surface 72 the other principal surface. The light guide. plate 70 also includes edges on the four sides thereof, i.e. a first edge 73, a second edge 74, a third edge 75, and a fourth edge 76. The first edge 73 is the incidence end surface of the light guide plate 70.

A light source 20 is provided at the first edge 73, where light from the light source 20 enters the light guide plate 70 from the first edge 73. The second edge 74 is opposite the first edge 73. The fourth edge 76 is opposite the third edge 75.

The rectangular coordinate system, and in particular the right-handed system of x axis, y axis, and z axis are used at some points to describe the embodiments. Here the z axis direction is a direction perpendicular to the emission surface 71. The positive z axis direction is defined as the direction from the rear surface 72 to the emission surface 71. The y axis direction is a direction perpendicular to the first edge 73. The positive y axis direction is defined as the direction from the first edge 73 to the second edge 74. The x axis direction is the direction perpendicular to the third edge 75 and the fourth edge 76; and the positive x axis direction is defined as the direction from the third edge 75 to the fourth edge 76. To avoid redundancy in the description, planes parallel to the xy, yz, and xz planes are sometimes referred to as the xy plane, yz plane, and the xz plane, respectively.

The light source 20 may include an LED. The optical axis of the light source 20 is substantially parallel to the y axis. Light from the light source 20 enters the first edge 73 and, as said light is totally reflected between the emission surface 71 and the rear surface 72 travels through the light guide plate 70 while spreading within a plane in the light guide plate 70 parallel to the emission surface 71. The center of the light guided by the light guide plate 70 is substantially parallel to the y axis. Thus, the light guide plate 70 guides light from the light source 20 such that the light spreads out in planar form in a plane parallel to the emission surface 71. The light guided through the light guide plate 70 maintains directivity at any location throughout the light guide plate 70. More specifically, the light guided through the light guide plate 70 is directional about a line connecting any location in the light guide plate 70 and the light source 20.

A plurality of light focusing portions 30 including a light focusing portion 30a, a light focusing portion 30b, and a light focusing portion 30c are formed on the emission surface 71 of the light guide plate 70. FIG. 1 illustrates the state where a plurality of light rays exiting from the light focusing portion 30a, light focusing portion 30b, and light focusing portion 30c and where the light rays from the light focusing portion 30a, light focusing portion 30b, and light focusing portion 30c converge. A light focusing portion 30 is formed sequentially for the most part along the x axis direction. The light entering the first edge 73 from the light source 20 is totally reflected between the emission surface 71 and the rear surface 72 and is guided by the light guide plate 70 and enters the light focusing portion 30 at each position of the light focusing portion 30 along the x axis direction. Here, the light guided by the light guide plate 70 is described as if there were no component spreading along the yz plane.

Each of the light focusing portions 30 includes a plurality of refraction surfaces 31. As illustrated in FIG. 2, the refraction surfaces 31 are one surface on a recessed prism formed as recesses in the emission surface 71.

The plurality of refraction light rays refracted by the refraction surfaces 31 in the light focusing portion 30a converges at a fixed point PA. The light focusing portion 30b corresponds to a fixed point PB on the image 6. The plurality of refraction light rays refracted by the refraction surfaces 31 in the light focusing portion 30b converges at the fixed point PB. The light focusing portion 30c corresponds to a fixed point PC on the image 6. The plurality of refraction light rays refracted by the refraction surfaces 31 in the light focusing portion 30c converges at the fixed point PC. The light refracted by the refraction surfaces 31 in any of the light focusing portions 30 thus converges to a single point corresponding to the light focusing portions 30. Note that when the fixed point P is near the rear surface 72 of the light guide plate 70, the emission light diverges from the fixed point P. Accordingly, when the fixed point P is near the rear surface 72 of the light guide plate 70, the refraction surfaces in the light focusing portions 30 create emission light that basically diverges from a single convergence point in a space and exits from the emission surface 71. The fixed points corresponding to the light focusing portions 30 are mutually different and the image 6 is formed in the space in accordance with the grouping of multiple fixed points.

The light guided by the light guide plate 70 may spread along the yz plane, and in this case, the light refracted at the refraction surfaces 31 of a single light focusing portion 30 converges substantially along a convergence line parallel to the yz plane and to the emission surface. For example, light refracted by the light focusing portion 30a converges substantially along a line parallel to the yz plane and the emission surface 71. Similar to when the fixed point P is near the rear surface 72 of the light guide plate 70, the refraction surfaces in the light focusing portion 30 creates emission light that basically diverges from a single convergence point in the space and exits from the emission surface 71. At some points the refraction light is described as converging at a fixed point P when describing the directivity of light striking the refraction surfaces 31 and the convergence of refraction light in the xy plane; note that this is merely to ensure the descriptions are easy to follow.

As can be understood from the drawings, the light focusing portion 30a is formed along a line 190a. For instance, the light focusing portion 30a may be created by placing a plurality of refraction surfaces 31 sequentially along the line 190a. Here, the line 190 is a straight line parallel to the x axis. Any of the light focusing portions 30 may be created by placing a plurality of refraction surfaces 31 sequentially along a straight line parallel to the x axis.

Thus, the light focusing portions 30 can each be formed along a predetermined line within a plane parallel to the emission surface 71. The light guide plate 70 guides light to the light focusing portions. Each of the light focusing portions 30 includes a refraction surface 31 that creates from the light incident thereon emission light in a direction substantially converging onto a single convergence point in a space and exiting from the emission surface 71.

According to one or more embodiments of the present invention, each of the light focusing portions 30 are configured so that the length dy thereof along the direction orthogonal to the line 190 does not exceed one half the distance Dy to an adjacent light focusing portion 30 in a direction orthogonal to the line 190. For example, dy may be approximately one half of Dy. It is thus possible to prevent an image 6 formed at the convergence point from appearing jagged.

Figure 3:
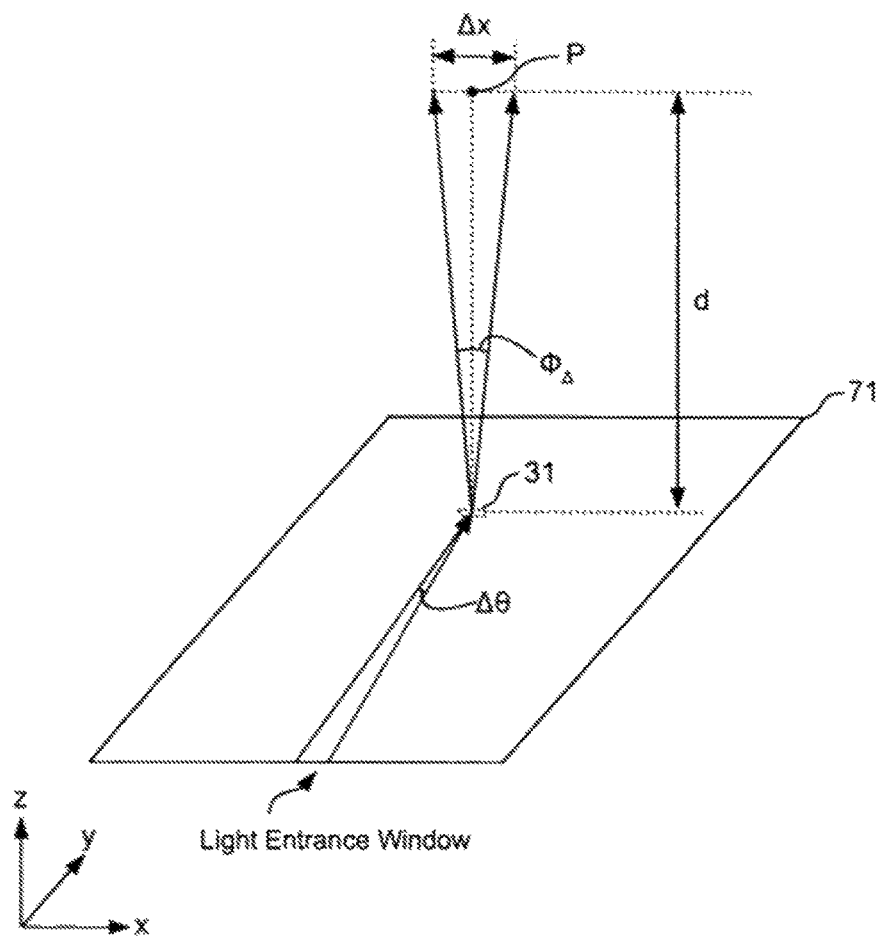
FIG. 3 schematically illustrates a relationship between a divergence angle $\Delta\theta$ of light incident on one refraction surface 31 and the divergence angle $\Phi\Delta$ of emission light therefrom.

FIG. 3 schematically illustrates a relationship between a divergence angle $\Delta\theta$ of incident of light incident on one refraction surface 31 and the divergence angle $\Phi\Delta$ of emission light therefrom. Note that $\Delta\theta$ is the divergence angle of light guided by the light guide plate 70. More specifically, $\Delta\theta$ is the divergence angle within the xy plane, i.e., the divergence angle within a plane parallel to the emission surface 71. In a light intensity distribution, along an angular direction, $\Delta\theta$ may be the position at which the light intensity is half the maximum (full width at half maximum).

In FIG. 3, $\Delta x$ represents the spread of the emission light along the x axis at the fixed point P due to the refraction surface 31; d represents the distance from the rear surface 72 to the fixed point P. Here, the light entering the refraction surface 31 and the light exiting due to the refraction surface 31 has directivity. More specifically, it is assumed that $\Delta x$ and $\Delta\theta$ are small. In this case, $\Phi\Delta x = \Delta x/d$ approximately holds true.

In reality, the divergence angle $\Phi\Delta$ is greater than $\Delta\theta$ because the emission light is affected by refraction among other things within the emission surface 71. Here, it is assumed that the divergence angle $\Phi\Delta x$ is $C\alpha$ times greater than $\Delta\theta$; $C\alpha$ is a value greater than 1. As an example, $C\alpha$ may be applied a value of 1.5.

According to one or more embodiments of the present invention, the value of d is 8 mm or greater when the fixed point P is near the emission surface 71, i.e., the fixed point P is near the observer. The three-dimensional image may be indistinguishable when d is less than 8 mm. In addition, according to one or more embodiments of the present invention, $\Delta x$ is less than or equal to 1 mm. Images such as logos or the like may be produced at an insufficient resolution when $\Delta x$ exceeds 1 mm.

Accordingly, in one or more embodiments of the present invention, $\Phi\Delta x$ is less than or equal to atan(⅛). That is in one or more embodiments of the present invention, $\Delta\theta$ satisfies $C\alpha \times \Delta\theta \leq$ atan(⅛); and, in one or more embodiments of the present invention, taking into account $C\alpha$, then $\Delta\theta$ is less than or equal to 5°.

Figure 4:
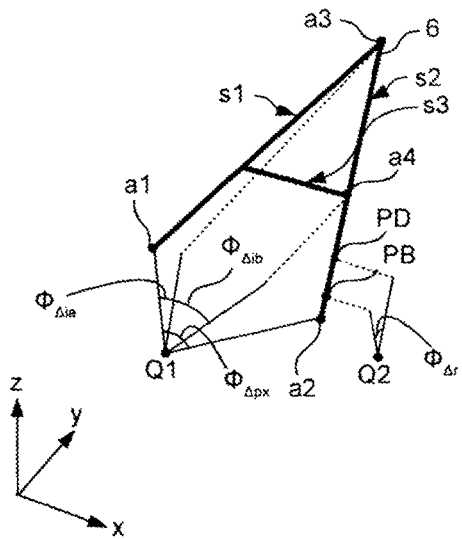
FIG. 4 is a schematic for describing features of an image 6.

FIG. 4 is a schematic for describing features of an image 6. Some examples of features may be: an image endpoint in a predetermined direction; at least one endpoint of a straight line making up the image; an intersection point between two lines making up the image; and an inflection point along a line making up the image. The image 6 includes a first endpoint a1, a second endpoint a2, a third endpoint a3, and an intersection point a4.

The first endpoint a1 is located at the furthest negative point of the image 6 along the x axis direction. The second endpoint a2 is located at the furthest positive point of the image 6 along the x axis direction. The angle $\Phi\Delta x$ is formed between a straight line connecting the first endpoint a1 and a point Q1 on the rear surface 72, and a straight line connecting the second endpoint a2 and the point Q1 on the rear surface 72. In this case, according to one or more embodiments of the present invention, $\Delta\theta$ satisfies $C\alpha \times \Delta\theta < (\Phi\Delta p/10) \times C\beta$; $C\beta$ is a constant greater than 1. More specifically, according to one or more embodiments of the present invention, $C\beta$ is applied the value 2. In this manner, according to one or more embodiments of the present invention, the condition $1.5\Delta\theta < \Phi\Delta p/5$ is satisfied taking $\Delta\theta$ as the divergence angle of light guided in the light guide plate 70, and $\Phi\Delta p$ as the angle between a line connecting two endpoints in the image in a direction along a predetermined line and a line connecting each of the plurality of light focusing portions 30. An observer is thus able to clearly perceive the image 6. Note that, according to one or more embodiments of the present invention, $\Delta\theta$ satisfies $C\alpha \times \Delta\theta < (\Phi\Delta p/N) \times C\beta$ when the image 6 must be produced from a convergence point divided into at minimum N parts.

The first endpoint a1 is one endpoint of a side s1, and the third endpoint a3 is the other endpoint of the side s1. The intersection point a4 is the intersection of a side S2 and a side s3. An angle $\Phi\Delta ia$ is formed between a straight line connecting the point Q1 and the first endpoint a1, and a straight line connecting the point Q1 and the third endpoint a3. An angle $\Phi\Delta ib$ is formed between a straight line connecting the point Q1 and the third endpoint a3, and a straight line connecting the point Q1 and the intersection point a4.

The angles $\Phi\Delta ia$ and $\Phi\Delta ib$ are within the xz plane. In this case, according to one or more embodiments of the present invention, $\Delta\theta$ satisfies $C\alpha\times\Delta\theta<C\beta\Phi\times\Phi\Delta ia$; according to one or more embodiments of the present invention, $\Delta\theta$ also satisfies $C\alpha\times\Delta\theta<C\beta\Phi\times\Phi\Delta ib$. Thus, according to one or more embodiments of the present invention, $\Delta\theta$ satisfies $C\alpha\times\Delta\theta<C\beta\times\Phi\Delta i$ when a line connecting two features of the image and lines connecting each of the plurality of light focusing portions 30 form an angle $\Phi\Delta i$. More specifically, according to one or more embodiments of the present invention, $\Delta\theta$ satisfies $1.5\Delta\theta<2\Phi\Delta i$. The observer can perceive the image 6 as three-dimensional because satisfying these conditions facilitates rendering a characteristic portion of the image 6 visible to the observer.

Assume here that a fixed point PD is a fixed point on the side s2 and adjacent to the fixed point PB in the y axis direction. An angle $\Phi\Delta r$ is formed between a straight line connecting the point Q2 and the fixed point PD, and a straight line connecting the point Q2 and fixed point PB. The angle $\Phi\Delta r$ is within the yz plane. In this case, according to one or more embodiments of the present invention, $\Delta\theta$ satisfies $C\alpha\times\Delta\theta<C\beta\Phi\times\Phi\Delta r$. Thus, according to one or more embodiments of the present invention, the condition $C\alpha\times\Delta\theta<C\beta\times\Phi\Delta r$ is satisfied when $\Phi\Delta r$ is the angle between two convergence points adjacent in a direction orthogonal to the lines formed by the light focusing portions 30 and a line connecting each of the plurality of light focusing portions 30. More specifically, according to one or more embodiments of the present invention, $\Delta\theta$ satisfies $1.5\Delta\theta<2\Phi\Delta r$. An observer is thus able to more clearly perceive the image 6.

Figure 5:
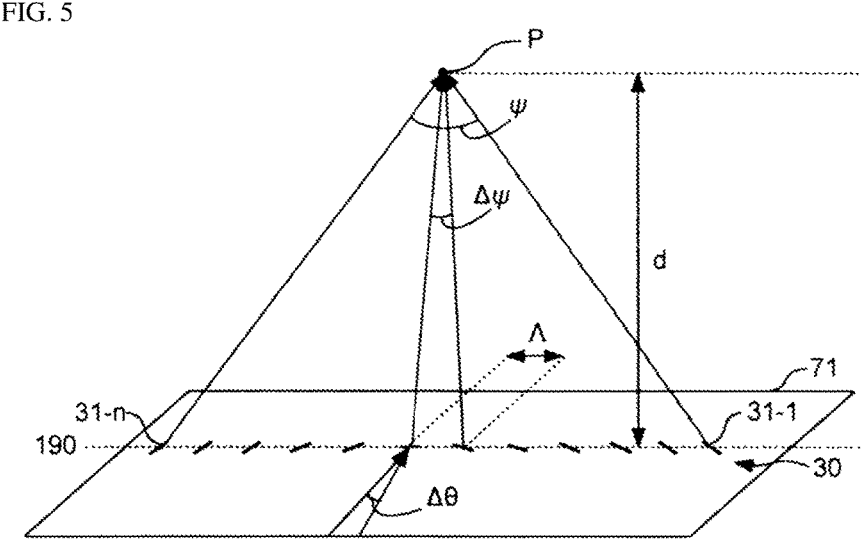
FIG. 5 outlines the relationship between the pitch of the refraction surfaces 31 and the divergence angle Δθ of light incident thereon.

FIG. 5 outlines the relationship between the pitch of the refraction surfaces 31 and the divergence angle $\Delta\theta$ of the incident light; FIG. 5 is a partial exploded view of one light focusing portion 30.

An angle $\Delta\phi$ is formed between a straight line connecting the refraction surfaces 31 and the fixed point P, and a straight line connecting the refraction surfaces 31 and the fixed point P. According to one or more embodiments of the present invention, the angle $\Delta\phi$ is less than 5°. That is, according to one or more embodiments of the present invention, when the refraction surface 31 and a second reflection surface 31 are provided set apart from each other, the refraction surfaces are arranged so that $\Delta\phi$ is less than 5°. The angle $\Delta\phi$ at less than 5° creates a uniform wave front of emission light from one of the light focusing portions 30.

Note that Λ is the positional deviation between the center positions of refraction surfaces 31 adjacent along the line 190. This distance Λ represents this pitch of the arrangement of refraction surfaces 31. When Λ is sufficiently smaller than the distance d from the emission surface 71 the fixed point P, then $\Delta\phi=\Lambda/d$ maybe approximated.

Additionally, according to one or more embodiments of the present invention, the expression $\Delta\phi<C\alpha\times\Delta\theta$ is also satisfied. More specifically, according to one or more embodiments of the present invention, the expression $\Delta\phi<1.5\Delta\theta$ is satisfied when is Cα is 1.5. It is thus possible to prevent a direction where the intensity of emission light is extremely low.

According to one or more embodiments of the present invention, the expression $\Delta\phi>\theta/5$ is also satisfied. Hereby, the emission light can be separated some extent. Therefore, contrast of the image may be improved through what is known as the black matrix effect. Note that, according to one or more embodiments of the present invention, at Dy illustrated in FIG. 1 (i.e., Dy is the distance between light focusing portions 30 adjacent in a direction orthogonal to the line 190) and the distance θ satisfy the expression $Dy<5\Lambda$.

The refraction surface 31-1 and the refraction surface 31-n in the light focusing portion 30 are positioned at both ends along the line 190 in FIG. 5. The refraction surface 31-1 is positioned at the end in the positive x axis direction. The refraction surface 31-n is positioned at the end in the near the negative x axis direction. An angle φ is formed between a straight line connecting the refraction surface 31-1 and the fixed point P, and a straight line connecting the refraction surface 31-n and the fixed point P. In this case, according to one or more embodiments of the present invention, φ is greater than or equal to 20°. Thus, according to one or more embodiments of the present invention, the angle formed between a line from each of the two endpoints along the direction of a line formed by the light focusing portion and the convergence point is greater than or equal to 20°.

Figures 6, 7:
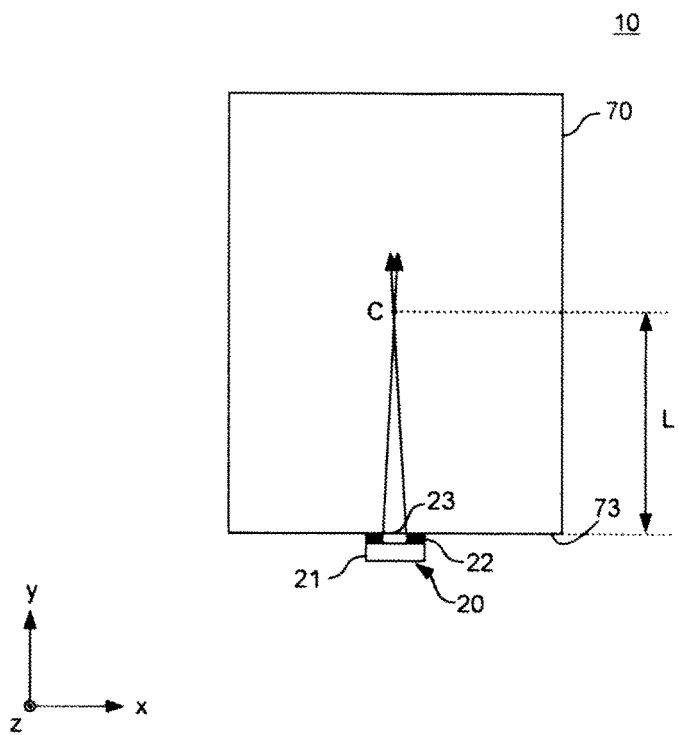
FIG. 6 illustrates experimental results pertaining to whether or not an image can be perceived.
FIG. 7 outlines a configuration of a light source 20.

When an image is presented on a transparent display device, the observer not only sees the image but can also see the rear surface of the display device. The observer may often move their head from side to side to verify whether the location of the image will change and to see that the image is actually present at that location. In this case the observer's head may move from side to side about 150 mm. Assuming that the observer's face is roughly 400 mm away from the light guide plate, the angle thereat is roughly 21 degrees. Accordingly, the observer may not be able to see the image when moving the head from side to side when the angle φ is less than 20° allows the observer FIG. 6 illustrates experimental results pertaining to whether or not an image is visible. An image was formed on a transparent light guide plate of a graphic made up of dots and lines; five adult males were chosen subject text whether the image was perceives when the subject moved their head from side to side. The symbol 'x' was used to represent either that the image disappeared in the subject shook their head or that the image did not appear to be three dimensional. The symbol 'o' was used to represent that the image appeared to be three dimensional even when the subject shook their head. The experimental results also illustrates that when φ is greater than or equal to 20°, and observer is able to perceive the image.

FIG. 7 outlines a configuration of a light source 20; the light source 20 includes a light emitting unit 21 and a light shielding part 22. The light shielding part 22 includes a window 23. The window 23 may be a slit that narrows light along the x axis direction. The light emitting unit 21 may be an LED. Only the light from the light emitting unit 21 that passes through the window 23 in the light shielding part 22 enters the first edge 73 of the light guide plate 70. The directivity of incidence light entering the light guide plate 70 may thusly increase. And in particular, this reduces the spread of the incidence light in the x axis direction. The width of the window 23 in the x axis direction may be adjusted to satisfy the conditions pertaining to the above described angle $\Delta\theta$.

Here, according to one or more embodiments of the present invention, given the distance L between the first edge 73 of the light guide plate 70 and the center C of the emission surface 71, and the width V of the spread of light entering the first edge 73 satisfies the expression $W\le L/10$. Here, the width of the window 23 in the x axis direction may be taken as W. Additionally, the width spread of an intensity distribution of light entering the first edge 73 may also be taken as W. For instance, assume that the horizontal axis represents a position along the x axis direction and that the vertical axis represents the light intensity of light entering from the first edge 73. In this case, the value of W may be applied to the full width at the position where the light intensity reaches half the maximum (full width at half maximum).

Figure 8:
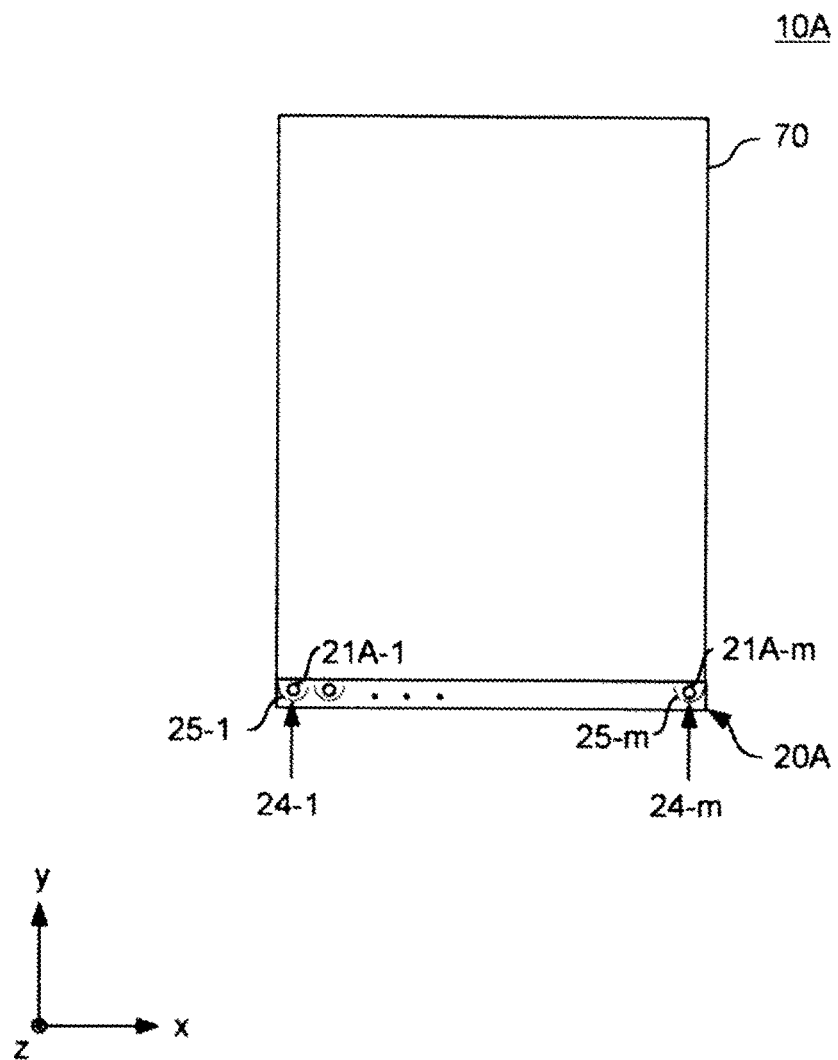
FIG. 8 schematically illustrates a display device 10A as an example of modifying the display device 10.

FIG. 8 schematically illustrates a display device 10A as an example of modifying the display device 10. Beyond including a light source 20A as an example of modifying the light source 20, the display device 10A is identical to the display device 10. The light source 20A is a planar light source. More specifically, the light source 20A inputs light substantially parallel to the y axis into the light guide plate 70.

The light source 20A includes m light source elements, i.e., the light source element 24-1 through the light source element 24-m. Here, m is an integer greater than or equal to 2. Each of the light source element 24-1 through the light source element 24-m are planar light sources that emit light substantially parallel to the y axis.

The light source element 24-1 includes a light emitting unit 21A-1, and a concave lens 25-1. The concave lens 25-1 is provided on the opposite side of the first edge 73 relative to the light emitting unit 21A-1. The concave lens 25-1 reflects the light emitted from the light emitting unit 21A-1 and converts the same to light substantially parallel to the y axis. The light source element 24-1 thus inputs substantially parallel light that is substantially parallel to the y axis into the first edge 73 of the light guide plate 70. Each of the light source element 24-2 through the light source element 24-m are configured identically to the light source element 24-1. The descriptions of the light source element 24-2 through the light source element 24-m are therefore omitted.

The light source elements 24-1 through 24-m are provided on the first edge 73 of the light guide plate 70 aligned in the x axis direction. The light source 20A thus inputs light into the light guide plate 70 that is substantially parallel to the y axis via roughly the entire first edge 73 of the light guide plate 70.

Figure 9:
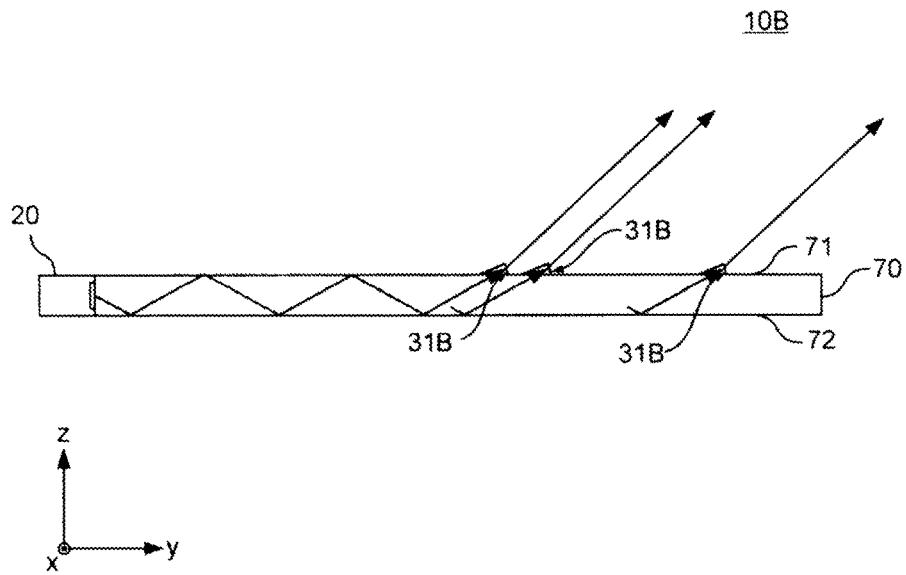
FIG. 9 schematically illustrates a yz cross section of a display device 10B as an example of modifying the display device 10.

FIG. 9 schematically illustrates a yz cross section of a display device 10B as an example of modifying the display device 10. Beyond including refraction surfaces 31B as an example of modifying the refraction surfaces 31, the display device 10B is identical to the display device 10. The refraction surfaces 31B are provided as convex prisms that protrude from the emission surface 71.

Note that the refraction surfaces 31 and the refraction surfaces 31B described with regard to FIG. 1 through FIG. 9 are optical surfaces on a single planar shape. The display device 10 and the display device 10A may be modified by replacing the refraction surfaces with a single Fresnel lens. Yet another way of modifying the embodiment would be to replace the plurality of refraction surfaces 31 forming a single light focusing portion 30 with a single Fresnel lens that continues along the x axis.

Figure 10:
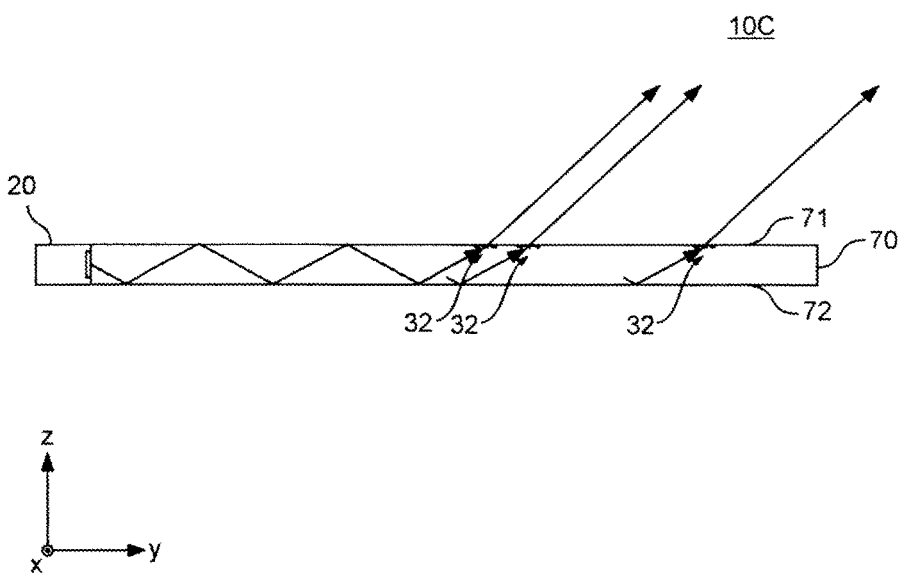
FIG. 10 schematically illustrates a yz cross section of a display device I OC as an example of modifying the display device 10.

FIG. 10 schematically illustrates a yz cross section of a display device 10C as an example of modifying the display device 10. Beyond including an optical surface 32 instead of the refraction surfaces 31, the display device 10C, is identical to the display device 10. The optical surface 32 is a diffraction grating formed on the emission surface 71. The optical surface 32 may be a transparent diffraction grating. According to one or more embodiments of the present invention, the display device 10C employs a light source 20 that emits coherent light. As a result, the light source 20 in the display device 10 may be a laser light source. The light source 20 may include a laser diode for instance.

The present invention is hereby described by way of the embodiments; however, the technical scope of the present invention is not limited to the above-described embodiments. It is obvious to a person skilled in the art that the above described embodiments can be modified or improved in various ways. The scope of the claims makes it clear whether such kinds of modifications or improvements to the embodiments are within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed arty order as desired. The terms "first", "next", and the like are used for convenience when describing operational flows within the scope of the claims, the specification, and in the drawings, and does not mean that execution in this order is required.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE NUMERALS

6 Image
10 Display device
20 Light source
30 Light focusing portion
21 Light emitting unit
22 Light shielding part
23 Window
31 Refraction surface
32 Optical surface
70 Light guide plate
71 Emission surface
72 Rear surface
73, 74, 75, 76 Edge
190 Line

The invention claimed is:
1. An optical device comprising:
a light guide plate configured to guide light within a plane parallel to an emission surface; and
a plurality of light focusing portions to which the light guide plate guides directional light,
wherein each of the light focusing portions is provided with an optical surface configured to create, from the directional light incident thereon, emission light in a direction substantially converging on a single convergence point or convergence line in a space, or to create emission light that substantially diverges from a single convergence point of convergence line in a space and exits from the emission surface,
wherein the plurality of light focusing portions are provided near the emission surface of the light guide plate, and each of the plurality of light focusing portions is formed along a predetermined line within a plane parallel to the emission surface, and
wherein the convergence point or convergence line is mutually different between the plurality of light focusing portions, with a grouping of the plurality of convergence points or convergence lines forming an image in a space.

2. The optical device according to claim 1, wherein the divergence angle of light guided by the light guide plate is less than or equal to 5° in a plane parallel to the emission surface.

3. The optical device according to claim 1, wherein the expression $1.5\theta<\Phi\Delta p/5$ is satisfied when taking $\Delta\theta$ as the divergence angle of light guided in the light guide plate, and $\Phi\Delta p$ as the angle between a line connecting two endpoints in the image in a direction along a predetermined line and a line connecting each of the plurality of light focusing portions.

4. The optical device according to claim 1, wherein the expression $1.5\theta<2\Phi\Delta i$ is satisfied when taking $\Delta\theta$ as the divergence angle of light guided in the light guide plate and $\Phi\Delta i$ as the angle formed between a line connecting two features in the image and lines connecting each of the plurality of light focusing portions.

5. The optical device according to claim 1, wherein the expression $1.5\theta<2\Phi\Delta r$ is satisfied when taking $\Delta\theta$ as the divergence angle of light guided in the light guide plate and $\Phi\Delta r$ as the angle between two of the convergence points adjacent in a direction orthogonal to a predetermined line and a line connecting each of the plurality of light focusing portions.

6. The optical device according to claim 1, wherein the expression $W \leq L/10$ is satisfied when taking L as the distance between an incidence end surface of the light guide plate and the center of the emission surface and W as the width light entering from the incidence end surface spreads.

7. The optical device according claim 1, further comprising:
a light source; and
a light shielding part located between the incidence end surface and the light source,
wherein the light shielding part is provided with a window configured to limit the light entering the incidence end surface.

8. The optical device according to claim 1, wherein at least one of the light focusing portions includes a plurality of refraction surfaces arranged continuously along a predetermined line.

9. The optical device according to claim 1, wherein the plurality of light focusing portions is configured so that the length of a light focusing portion along the direction orthogonal to the predetermined line does not exceed one half the distance to a second adjacent light focusing portion in a direction orthogonal to the predetermined line.

10. The optical device according to claim 1, wherein at least one of the light focusing portions includes a plurality of optical surfaces forming a diffraction grating.

11. The optical device according to claim 1, wherein at least one of the light focusing portions includes a plurality of optical surfaces forming a Fresnel lens.

12. The optical device according to claim 1, wherein the plurality of optical surfaces are partitioned along a predetermined line for at least one of the light focusing portions.

13. The optical device according to claim 12, wherein the expression $\Delta\phi<1.5\theta$ is satisfied when taking $\Delta\phi$ as the angle formed between a line connecting a first optical surface from the plurality of optical surfaces partitioned and the convergence point or a point along the convergence line and a line connecting a second optical surface adjacent to the first optical surface and the convergence point or a point along the convergence line, and taking $\Delta\theta$ as the divergence angle of light guided by the light guide plate.

14. The optical device according to claim 12, wherein the angle formed between a line connecting a first optical surface from the plurality of optical surfaces partitioned and the convergence point or a point along the convergence line and a line connecting a second optical surface adjacent to the first optical surface and the convergence point or a point along the convergence line is less than 5°.

15. The optical device according to claim 12, wherein the expression $\Delta\phi>\theta/5$ is satisfied when taking $\Delta\phi$ as the angle formed between a line connecting a first optical surface from the plurality of optical surfaces partitioned and the convergence point or a point along the convergence line and a line connecting a second optical surface adjacent to the first optical surface and the convergence point or a point along the convergence line, and taking $\theta$ as the divergence angle of light guided by the light guide plate.

16. The optical device according to claim 1, wherein the pattern density of the plurality of optical surfaces provided to the plurality of light focusing portions is less than or equal to 30% in a plane parallel to the emission surface.

17. The optical device according to claim 2, wherein the expression $1.5\theta<\Phi\Delta p/5$ is satisfied when taking $\Delta\theta$ as the divergence angle of light guided in the light guide plate, and $\Phi\Delta p$ as the angle between a line connecting two endpoints in the image in a direction along a predetermined line and a line connecting each of the plurality of light focusing portions.

18. The optical device according to claim 2, wherein the expression $1.5\theta<2\Phi\Delta i$ is satisfied when taking $\Delta\theta$ as the divergence angle of light guided in the light guide plate and $\Phi\Delta i$ as the angle formed between a line connecting two features in the image and lines connecting each of the plurality of light focusing portions.

19. The optical device according to claim 3, wherein the expression $1.5\theta<2\Phi\Delta i$ is satisfied when taking $\Delta\theta$ as the divergence angle of light guided in the light guide plate and $\Phi\Delta i$ as the angle formed between a line connecting two features in the image and lines connecting each of the plurality of light focusing portions.

20. The optical device according to claim 2, wherein the expression $1.5\theta<2\Phi\Delta r$ is satisfied when taking $\Delta\theta$ as the divergence angle of light guided in the light guide plate and $\Phi\Delta r$ as the angle between two of the convergence points adjacent in a direction orthogonal to a predetermined line and a line connecting each of the plurality of light focusing portions.

* * * * *